US000001219H

United States Statutory Invention Registration [19]

[11] Reg. Number: H1219

Miller

[43] Published: Aug. 3, 1993

[54] ELECTRICALLY SMALL CAVITY ANTENNA

[75] Inventor: Joseph F. Miller, Kitnersville, Pa.

[73] Assignee: The United States of America as represented by the Secretary of the Navy, Washington, D.C.

[21] Appl. No.: 688,777

[22] Filed: Apr. 19, 1991

[51] Int. Cl.[5] ..... H01Q 1/28

[52] U.S. Cl. ..... 343/708; 343/745; 343/789

[58] Field of Search ..... 343/708, 789, 745

[56] References Cited

U.S. PATENT DOCUMENTS

| | | | |
|---|---|---|---|
| 3,009,153 | 11/1961 | Masters et al. | 343/789 |
| 4,540,988 | 9/1985 | Munk et al. | 343/789 |
| 4,564,843 | 1/1986 | Cooper | 343/745 |
| 4,656,483 | 4/1987 | Jaquet | 343/745 |
| 4,791,429 | 12/1988 | Hannan | 343/789 |
| 4,806,944 | 2/1989 | Jacomb-Hood | 343/745 |

OTHER PUBLICATIONS

ARRL Antenna Book, published by the ARRL, Newington, Conn., 15th Ed., 1988, pp. 25-1 to 25-25.

*Primary Examiner*—Bernarr E. Gregory

*Attorney, Agent, or Firm*—James V. Tura; James B. Bechtel; Susan E. Verona

[57] ABSTRACT

A supersonic aircraft or missile broad bandwidth antenna is provided. This antenna is constructed into a cavity created in the fuselage or wing of the aircraft and covered with a radome for flush mounting. The cavity comprises side walls and a bottom constructed of electrically conductive materials which are caused to be electrically excited by an antenna element located within the cavity. This antenna element, which is capable of broad bandwidth operation, is either passively or actively tuned. Active tuning is carried out by a logic converter circuit connected to the antenna from a communications transceiver.

17 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1
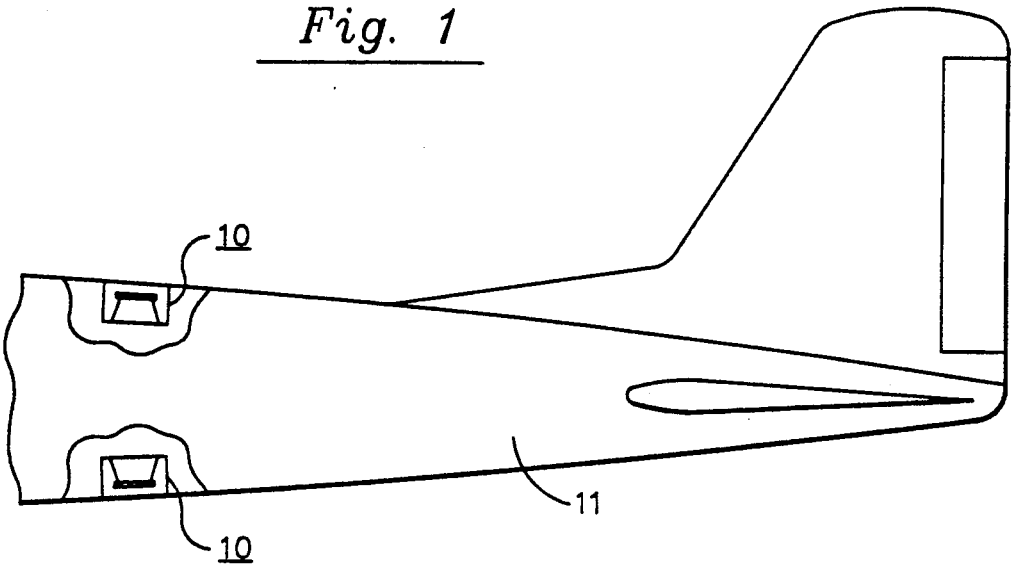
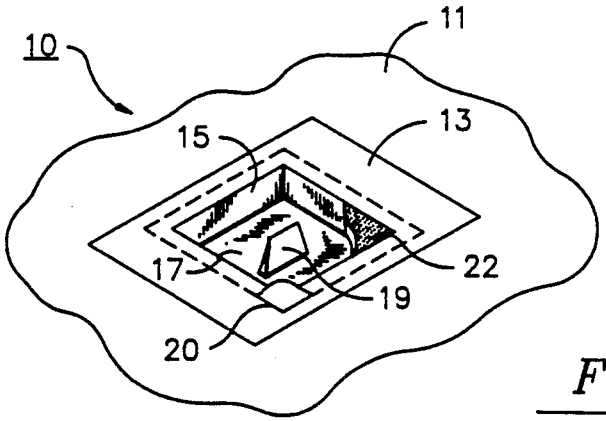
Fig. 2
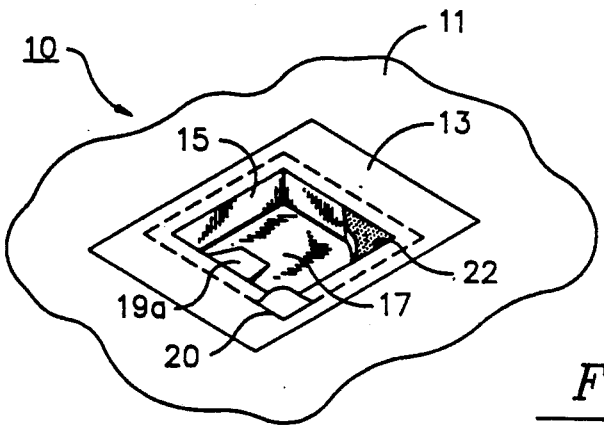
Fig. 3

ELECTRICALLY SMALL CAVITY ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radio antennae for use on aircraft, and in particular relates to broad frequency bandwidth antennae for radio communications with subsonic and supersonic speed aircraft.

DESCRIPTION OF THE PRIOR ART

Communications antennae for use on aircraft have been the subject matter of patent protection issued in the prior art. Many antennae have been molded to lie flat on the surface of an aircraft.

Cary, U.S. Pat. No. 2,701,307, shows an aircraft radio antenna formed by flat metallic sheet portions mounted on the tail fin of an aircraft. These sheet portions form the poles or element portions of a transceiving antenna. Each element is insulated from the metallic skin of the aircraft by an insulating sheet of plastic. The design limits itself to installations on a vertical stabilizer. Moreover, there is no indication that continuous broad-band performance is obtained.

Other types of VHF and UHF broad band antennae have been designed as air foil type, blade-shaped antennae. These antennae are designed to have a structure blade member attached to the surface of the aircraft and extending outwardly therefrom. A blade antenna structure is intended to be mounted externally on the fuselage or wings of an aircraft.

The antenna element portions of such external blade antennae have been formed as part of the blade-shaped structure to lie flat on the surface of each blade and to be electrically insulated from the metal structure by an insulating member.

Young et al., U.S. Pat. No. 3,220,006, show such an external blade antenna where the entire metal skin of the blade structure forms the element portions of the antenna itself. In the Young structure, the blade is hollow and filled with a structurally capable dielectric. Portions of the blade skin are physically and electrically separated from one another to form the separate elements of the antenna. A laminated dielectric structural material, such as fiberglas sheet, connects the metal portions of the skin to present an aerodynamically satisfactory surface. These are mechanical improvements to a ground plane VHF antenna where a blade-type dipole configuration is obtained by reflecting a monopole element in a ground plane.

Dolan, U.S. Pat. No. 3,453,628, shows a silicon-based adhesive for mounting his antenna elements to an external blade structure. The adhesive acts as a vicious damping medium to reduce aircraft vibrations to the laminated skin antenna elements glued to the flat surfaces of the blade and electrically insulated therefrom.

Anderson et al., U.S. Pat. No. 3,210,764, show a dual band antenna mounted on the surface of an external standard blade structure. A plurality of flat film-type elements are attached to various surfaces of the blade structure. A first element acts as a monopole radiating element on one side of the blade and also serves as a ground plane for other elements positioned on the opposite side of the blade. The opposite side of the blade carries separate UHF and VHF antenna elements. Anderson, et al. show a standard blade antenna used for narrow band VHF and UHF communications with a built in passive matching network and a band separation filter.

Demko, U.S. Pat. No. 4,072,952, shows an external blade antenna with film-type antenna elements on the surface of the blade. Demko adds microwave landing system (MLS) antenna elements onto the blade structure which had previously contained only VHF/UHF antenna elements.

A "Tee" slot blade antenna, where the metallic skin of a blade structure mounted externally to the fuselage of an aircraft forms the elements of a VHF antenna, is shown by Robin et al., U.S. Pat. No. 4,509,053. Like Young et al. above, Robin et al. uses a structural dielectric to maintain the blade shape. An aerodynamically continuous surface of the blade is assured by dielectric laminated fiberglas sheets filling between skin antenna elements. The resonant frequency of the antenna is determined by the lengths and relative positions of longitudinal and transverse dielectric sections which determine the remaining antenna element real estate. Impedance matching circuits are incorporated to electrically tune the antenna.

The use of electrical circuits to control the tuning of external blade antenna elements is also shown by Sawicki et al., U.S. Pat. No. 4,087,817. A simple blade shaped monopole element has a molded covering of dielectric material. A loop antenna element is mounted perpendicularly to the blade antenna. An electrical network is utilized to couple the blade and loop antennae to an ADF (automatic direction finder) receiver and a VHF communications transceiver.

The aerodynamic performance of very high speed and ultra high speed aircraft and missiles can be affected by external blade antenna. Fluid dynamic disturbances set up by external blade antennae are often times undesirable. Vibrations in an aircraft or missile can alter antenna performance and even destroy the antenna. Heat due to friction can also alter or harm sensitive antenna elements.

Cavity antennae and flush mounted antennae have been considered as a solution to these problems. By mounting a communications or microwave antenna within a cavity in an aircraft/missile body, there is created an opportunity for alternate antenna element structures. With cavity antennae the constraints for flat film or skin surface elements, as used with external blade antennae, are removed. Cavity type designs also afford more protection of antenna elements.

Stang, U.S. Pat. No. 3,725,941 shows a high frequency, high power coil type transmitting antenna embedded in a dielectric notch shaped enclosure which is held in a structural box member formed as an integral part of the leading edge of the vertical stabilizer of an aerospace vehicle. The dielectric fill material conforms to the shape of the stabilizer and is of a size to cooperate with signal modification by the metallic structure of the stabilizer. The antenna is very narrow banded, single frequency, and relies upon the fuselage to become excited and enhance the antenna's efficiency. It can be manually tuned to different frequencies by adjustment of capacitors or inductors.

A subsurface fuselage antenna is shown by Milligan, U.S. Pat. No. 4,431,996. Milligan makes a narrow circumferential aperture around a missile body. This slot in the skin of the missile holds four separate antenna segments, each being an annularly shaped quarter wavelength standard microwave antenna. A dielectric structure, such as a radome covers the slot. Although this structure has multi-frequency capability, it requires a separate antenna for each frequency and does not have general broad band capabilities.

Howell, U.S. Pat. No. 3,403,403, shows a filter assembly for a missile nose cone. An antenna is located within the nose cone and radiates signals through an elongated slot. A printed circuit plural board assembly forms a filter for unwanted signals. The design allows 245.3 MHz telemetry signals to radiate from the antenna. The filter operates at 1300MHz, only.

Eng et al., U.S. Pat. No. 4,245,222, shows a dual function antenna in a single slot-type cavity near the base of a missile body. The slot shaped cavity has a pair of parallel ports, one each for each of two transversely positioned half wavelength antenna elements used for telemetry and radar bands. The size of each port is tuned in relationship to the wavelength of its respective antenna and therefore the structure is focused for a specific bandwidth.

Frosch, U.S. Pat. No. 4,287,518, shows a flush mount, rectangular box cavity, micro-strip dipole antenna. A pair of mutually orthogonal dielectric plane surfaces, mounted normal to the plane of an open face of the box cavity, each carries printed antenna dipole elements. A radome member may cover the open face. The positioned antenna dipole elements are removed from the radome surface and the heat distortion generated therefrom. The antenna cavity must be electrically resonant and passively matched thereby it is physically large. The design is 1.5:1 in bandwidth.

Blasko, U.S. Pat. No. 3,613,098, shows a small cavity VHF antenna adapted for flush mounting in an aircraft vertical stabilizer. The cavity extends completely through the stabilizer and contains a signal emanating structure. A radome covers each side of the cavity to provide a continuous stabilizer skin. The emanating structure contains a rectangular cone shaped reflector structure opening towards the rear of the stabilizer with a signal conductor at its tip/point and back plate behind the conductor. The cavity and its enclosed emanating structure are balanced so as to radiate from both the port and starboard sides of the stabilizer thereby creating an omnidirectional pattern in azimuth. The design is inherently narrow banded VHF (118–136 MHz), the cavity and rectangular cone shape would accentuate the return of a radar signal.

This prior art is either directed to broad band external blade antennae of the size large enough to be restrictive for use on supersonic aircraft and missiles or of cavity antenna designed for specific narrow band performance.

The recent development of broad frequency band communication radios, i.e., 30–400 MHz, has necessitated the development of blade antennae of comparable bandwidth. Since, in many applications the system is to be installed on high subsonic or supersonic aircraft, the blade antenna size is restricted to heights, typically, of 14.5 inches and 9 inches, respectively. Although the passively matched 14.5 inch height blade antenna has performed adequately over the 30–400 MHz band, the 9 inch height blade has had unsatisfactory performance especially in the 30–88 MHz portion of the band due to its small aperture height. Several blade antennae now available commercially overcame this low gain problem by incorporating an actively tuned aperture thereby increasing the gain at the lower frequencies to be comparable to or greater than that of the 14.5 inch height blade antenna with passive impedance matching.

However, communications requirements in recent years together with the enhanced aerodynamical requirements on the aircraft, have provided a need for extremely broad band flush mounted antenna apertures. Applications on the bottom of the fuselage of aircraft with little ground clearance offer additional uses. It is therefore important that this antenna provides an electrically small image while being comparable in performance to standard fuselage mounted blade antennae that are suitable for long range system operation.

Additionally, the antenna aperture should be of small physical size in relation to the frequency of operation in order to make it suitable for installation on high performance aircraft with a minimum of available space.

SUMMARY OF THE INVENTION

An object of this invention is to provide an extremely broad bandwidth flush mounted aircraft or missile antenna of comparable performance to a standard fuselage mounted blade antenna which is suitable for long range system operation.

A second object of the present invention is to provide such a flush mounted antenna with an electrically small cavity in relation to the frequency of operation of the antenna.

A further object of the present invention is to provide such an antenna cavity whose aperture is excited by an element located internal to the cavity.

The objects of the present invention are realized in an electrically small cavity antenna mounted in the fuselage or other structural member of an aircraft to provide an aerodynamic flush mounting. A cavity is formed in the fuselage with four walls and a bottom of conductive material. The cavity wall shape need not be square or rectangular, however, the modification of this wall shape will affect the performance of the antenna.

An antenna element is used to excite the cavity. This antenna element is a blade-type element which is capable of broad bandwidth performance and can either be passive or actively tuned. The active antenna element is typically tuned in frequency from the serial data generated by a communications transceiver through a transducer mechanism commonly known as a logic converter.

This transducer accepts serial data from the transceiver, or directly from a data bus, and through appropriate output line drivers activates switches, either internal to the antenna element or nearby, such that the proper coils, capacitors and required impedance matching components can be inserted in the circuit to resonate the antenna element in the cavity at each selected frequency. A commercially available tuner may be used as the tuning speed of some commercially available tuners is more than adequate to handle the required "hopping" rates of today's available transceivers.

Lightning suppressers are also included in the antenna element to minimize the effects of lightning entering the aircraft. The possibility of lightning strikes is greatly minimized with the flush mounted antenna design as compared to an external blade antenna design.

The cavity forms a well in the skin of the aircraft. The open face or aperture of the cavity can be suitably enclosed with a radome of low loss characteristics such as Teflon or fiberglas.

DESCRIPTION OF THE DRAWINGS

The features, advantages and operation of the present invention will be better understood from a reading of the following Detailed Description of the Invention in conjunction with the following drawings in which like numerals refer to like elements and in which:

FIG. 1 is a perspective view of the electrically small cavity antenna of the present invention mounted in the fuselage of an aircraft;

FIG. 2 is an expanded perspective view of the electrically small cavity antenna of FIG. 1;

FIG. 3 is an expanded perspective view of an alternate embodiment of the electrically small cavity antenna of FIG. 2 showing the antenna element in a side mount position;

DETAILED DESCRIPTION OF THE INVENTION

Figure 5:
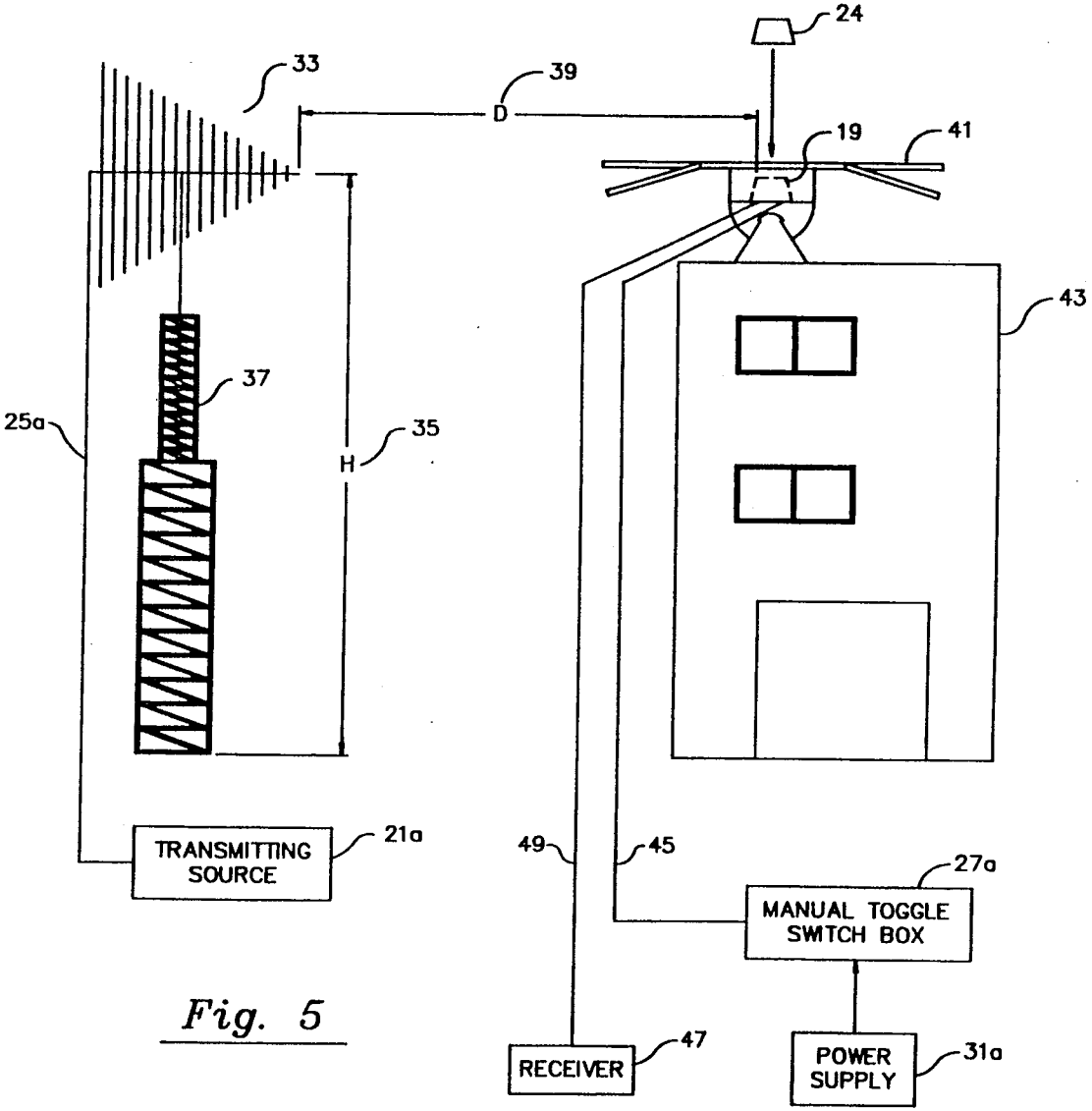
FIG. 5 is a block diagram of the electrical test set up for optimization of gain of the antenna element.

An electrically small (i.e. substantially 1/50th of a wavelength in cross-section of diameter opening) cavity antenna 10 is intended to be mounted in the fuselage 11 of an aircraft, FIG. 1. This antenna is suitable for operation over the broadband 30–400 MHz frequency band. It is a flush mounted antenna which radiates or receives vertically polarized waves over that continuous frequency band.

FIG. 2 shows an expanded perspective view of the flush mounted embodiment shown in FIG. 1. The fuselage 11 can be cut out to fit the antenna 10 at any space available in the airframe, typically, on the top and/or the bottom of the fuselage 11. Sites are chosen to provide the best "look angle" or field of view of the antenna similar to that chosen for a standard blade antenna installation. The installation can include a flush mount finish surface 13 through which the cavity opens. The cavity is comprised of side walls 15 and a bottom wall 17. A blade-type antenna element 19 is positioned in the center of the bottom wall 17 to extend outwardly in parallel to the side walls 15. This blade antenna element 19 will be discussed further below.

As shown in FIG. 2, the cavity defined by the walls 15 and the bottom 17 is rectangular in shape. In this embodiment, the width of the electrically small cavity is approximately 22 inches (0.06 wavelengths) and the length of the cavity is approximately 24 inches (0.06 wavelengths), while the depth of the cavity is approximately 10 inches (0.03 wavelengths). The walls 15 and the bottom 17 are formed of aluminum sheet or any other comparable conductive material. This cavity wall shape need not be square or rectangular, but can also be circular in construction or have tapered walls, as will be discussed further below. The open aperture of the cavity can be suitably enclosed with a radome 20.

FIG. 3 shows an alternate position embodiment for the blade-type antenna element 19*a*. Here, the blade antenna element 19*a* is mounted on a side wall 15.

The antenna elements 19, 19*a* which are used to excite the cavity walls can be of either passive or active tunable designs. The best efficiency and highest gain are achieved with actively tuned blade antenna elements. The conductive walls of the cavity and blade act as radiating elements.

To ensure adequate protection from the environments, the cavity can be completely sealed to prevent the intrusion of water and/or moisture. To adequately provide against vast pressure change differentials, which may result in radome failure, the cavity can also be filled with low loss foam 22, typically of the 2 pounds per cubic foot density. The radome 20 is then attached to the foam 22 and to the finish surface 13 with a proper dielectric adhesive.

The blade antenna element 19, 19*a*, can be of a commercially available type as offered by Chelton Electrostatics, Ltd., Marlow Buckinghamshire, England, model type 12-190 series or equivalent. This blade antenna is actively tuned and provides VHF/UHF performance in a frequency range of 30–400 MHz. Its Voltage Standing Wave Ratio (VSWR) for VHF processing is 2.5:1 maximum, and for UHF processing is 2.0:1 maximum. The blade is approximately 9 inches high and 9 inches long at its base, with an element tube on its top edge which is approximately 11 inches long dependent on antenna type.

A series of printed circuit inductors are used to resonate a capacitive radiating element in this Chelton antenna 19, 19*a* to the required frequency of operation. The switching of the inductors in and out of circuits is accomplished by P-I-N diodes that are themselves controlled by voltage levels received from a separate logic converter. Frequency setting information is initially derived from an associated transceiver and then translated into the correct antenna tuning code by the logic converter. This will be discussed further below.

Figure 4:
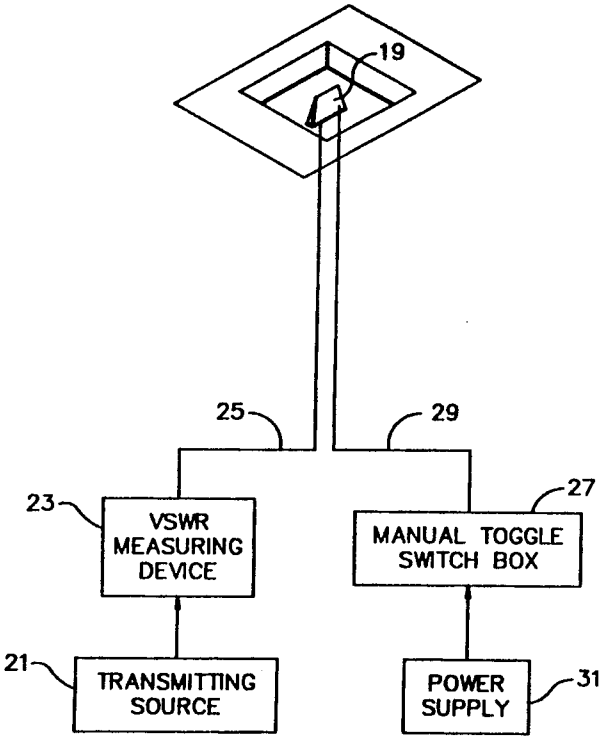
FIG. 4 is a block diagram of an electrical circuit for tuning the performance of the antenna element for optimum voltage standing wave ratio.

FIG. 4 shows a block diagram of an electrical circuit for optimizing the performance of the blade antenna element 19 under manual operation. A transmitting source 21, typically implemented by a frequency generator, is connected into a VSWR measuring device 23. This VSWR measuring device 23 is connected through a first shielded coaxial cable 25 to the blade antenna element 19 mounted in its associated cavity and ground plane. A manual toggle switch box circuit 27 is also connected to the blade antenna element 19 through a second shielded cable 29. The manual toggle switch box 27 is powered from a multi-conductor DC power supply 31 which is connected thereto.

After the test equipment is set up as shown in FIG. 4, the transmitting source 21 is set to transmit a 30 MHz signal and all toggle switches in the manual toggle switch box are set to the off position. The manual toggle switch box 27 is conveniently set up as typically an 8 switch or 8 position (instruction) device dependent on antenna type.

With the transmitting source 21 set at the first frequency value, the VSWR value from the measuring device 23 is recorded. This process is typically repeated every 2 MHz from 30 MHz to 400 MHz. As part of this process, the 256 possible combination switch positions for the manual toggle switch box 27 are successively set and the VSWR value for that setting is recorded. In this manner, switch settings for the toggle box 27 are established to offer VSWR values of less than 2.5:1 at each measured frequency.

The optimization of the gain of the blade antenna element 19 can be established as shown in the electrical test set up of FIG. 5. A transmitting source 21*a* is connected through a third coaxial shielded cable 25*a* to a 30–400 MHz transmitting antenna 33. This antenna 33 is mounted at a height 35 above the ground on an antenna tower 37. For purposes of the test at hand, the height 35 is set at approximately 43 feet.

A standard gain reference antenna 24 and the blade antenna element 19 are positioned at a reference distance 39 from the transmitting antenna 33. For the purposes of this test, the distance 39 is set at approximately 100 feet.

First, the recessed blade antenna element 19 in its associated cavity is set on a turnable antenna stand 41 with a 32 foot diameter ground plane. The antenna stand 41 is positioned on top of a building 43 or other convenient structure.

A manual toggle switch box 27*a* provides typically eight control lines 45 to the blade antenna element 19 for tuning the frequency of this element 19. This manual toggle switch box 27*a* receives power from a DC power supply 31*a*. A radio frequency receiver 47 is connected to the blade antenna element 19 through a fourth coaxial shielded cable 49.

This test set up is used to empirically determine the switch positions of the manual toggle switch box 27*a* for the maximum gain values of the blade antenna element 19. The transmitter source 21*a* is set to transmit a frequency of 30 MHz and all the toggle switches on the switch box 27*a* are set to the off position. The received power level as sensed by the receiver 47 is recorded in decibels (db).

As with the previous procedure, these steps are repeated for every 2 MHz from 30 MHz to 400 MHz. Additionally, for each frequency tested, the sequence of all of the successive combinations of the switch box 27*a* are tested and the amplitude value is recorded for each frequency. This data, therefore, will provide a list of values for switch positions that offer the highest received power level at each measurement frequency.

The blade antenna element 19 can be replaced with a standard gain reference antenna 24. A comparison of the values of the respective power levels for each frequency for the blade antenna element 19 with respect to the standard reference antenna can be made.

From the information obtained in the VSWR and gain tests, a single list of switch positions for each frequency is obtained that offers optimum antenna performance within certain instances a compromise between best gain and best VSWR.

Figures 6A, 6B:
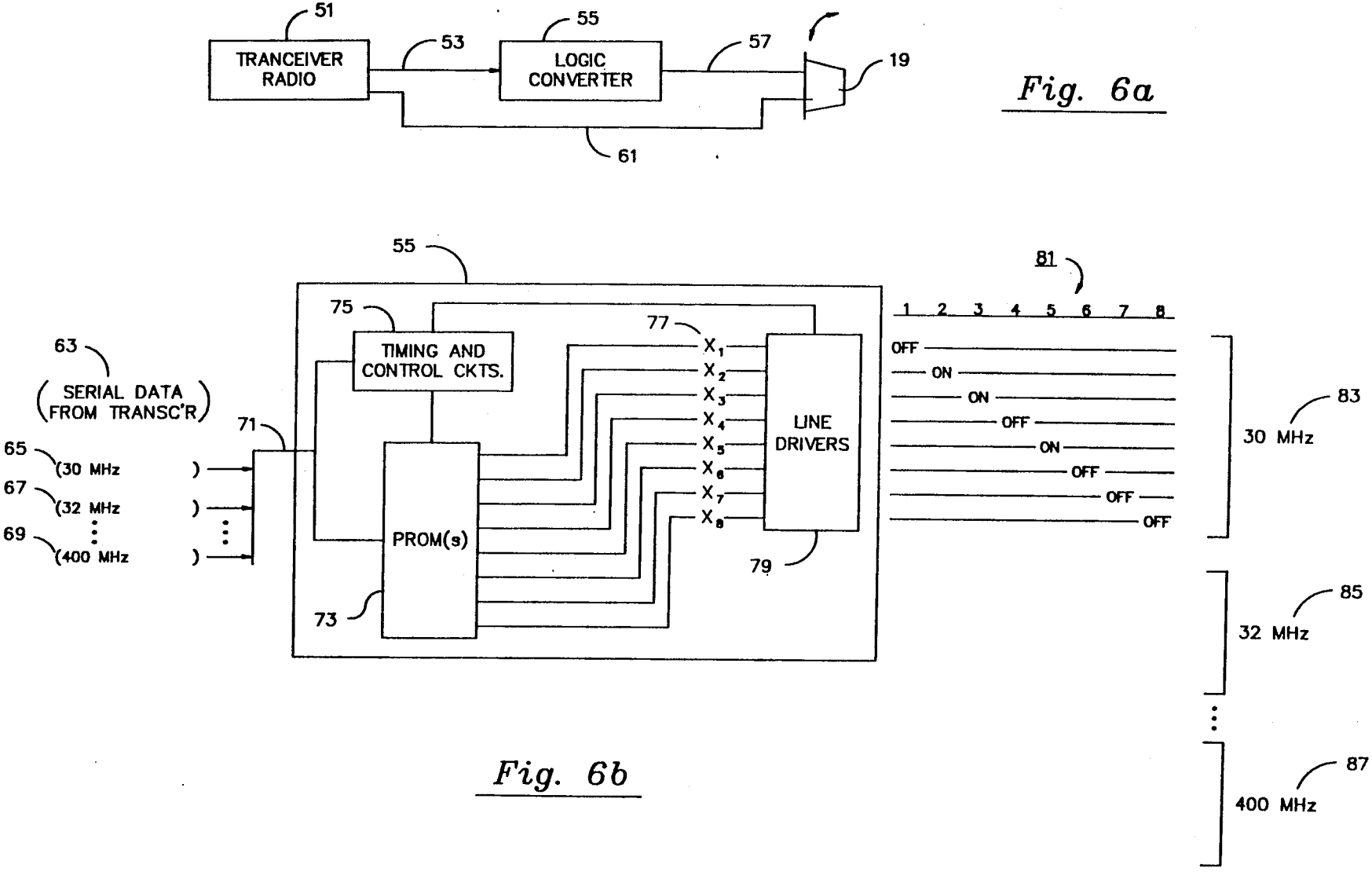
FIG. 6*a* is a block diagram illustrating the transceiver and logic converter circuit connection to the antenna element.
FIG. 6*b* is a block diagram illustrating the communications signal operation of the logic converter to antenna element connection.

A communication transceiver system hook up for the flush mounted tunable cavity antenna 10 is shown in FIG. 6*a*. A transceiver radio 51 is connected through cabling 53 into a logic converter circuit 55. This logic converter circuit 55 provides an output on the control line 57 to tune the blade antenna element 19. This blade antenna element 19 may be on a fixed position, as shown in the cavity embodiments of FIGS. 1 and 2. The transceiver radio 51 is connected through a RF frequency transmission line 61 to the blade antenna element 19.

The connection 53 of FIG. 6*a* carries serial data information 63 from the transceiver 51, as shown in FIG. 6*b*. This serial data 63 carries a code for one of the frequencies that the transceiver 51 may be operating at the moment. As an example, an instruction word 65 would be present when a 30 MHz signal is being transmitted by the transceiver 51. This would be likewise true when the transceiver 51 is switched into the receive mode. Other individual instruction words 67 through 69 are present, on an exclusive basis, as the transceiver 51 is set for other frequencies up through its maximum frequency of 400 MHz.

These instruction words 65, 67, 69 are connected into a PROM 73 and timing and control circuits 75 through a connection line 71. The PROM 73 has recorded, i.e. stored, in it the optimum or desired toggle switch settings for the switch boxes 27, 27*a* for yielding the desired VSWR readings and the maximum gain values obtained empirically with the test set ups of FIGS. 4 and 5. This is a control "profile" for tuning the particular blade antenna element 19 for a particular operating frequency.

The PROM 73 provides an instruction word to control circuits 75 as a function of the frequency 65, 67, 69 of operation of the transceiver 51. The PROM 73, associated control circuits 75 and line drivers 79 are located within the logic converter 55. The output of the control circuits 75 and prom(s) 73 is carried on individual lines 77 implementing the structure previously discussed with respect to the control lines 45 of FIG. 4 and control lines 29 of FIG. 5. Each of the lines 77 in FIG. 6*b* has an associated line driver 79 to increase the power and assure proper signal levels. These control lines are then connected to tune the operation of the Chelton Electrostatics, Ltd. blade antenna or equivalent according to the manufacturer's specifications.

The signals out of the line drivers 79 automatically simulate the manual operation of the toggle switch box to emulate the switch positions 81 and to tune the blade antenna element 19 to any of the instantaneous frequency 83, 85, 87 of the transceiver radio 51.

The data for tuning the blade antenna element 19 will vary with the choice of available blade antennae. The frequency setting information is usually derived from the associated transceiver 51 and translated into the correct antenna tuning code 81 by the PROM 73 and control circuits 75 within the logic converter 55.

To determine the proper tuning code of another blade antenna, this blade antenna with its associated cavity would likewise have to be mounted on top of a ground plane in a free-space environment. Again, a manually operated switch box consisting of typically eight or more toggle switches, depending upon the blade antenna model selected, would then be connected to the antenna. Appropriate D-C voltage levels are applied to the switches depending upon the antenna model. A signal source is then connected to a transmitter antenna at an appropriate distance from the tunable blade antenna mounted on the ground plane.

The signal source is then set to the first frequency and the tunable blade antenna is connected to a suitable receiver with the mechanical toggle switches moved individually in a systematic order to obtain the best gain from the blade antenna. All combinations of the toggle switches are worked through with every frequency for mapping the frequency band between the minimum and maximum frequencies of operation. The switch positions offering the best gain are noted and recorded for each frequency. A determination of absolute gain is made with respect to a reference antenna.

While this procedure has been described as being manually established and mapped, the transmitting of various frequencies can be computerized and automatically sequentially walked through. Likewise, the sequential setting of the control switch lines by means of the switch box 27, 27*a* can be computerized and automatically conducted. Computer programmable established control operations can therefore map the data necessary for a PROM 73 "profile" for a selected blade antenna 19.

Likewise, the VSWR measurements for the tunable blade antenna will of necessity be repeated as the selection of a blade antenna element 19 is changed. The VSWR measurement test procedure can also be automated with a computer program control procedure.

Figure 7:
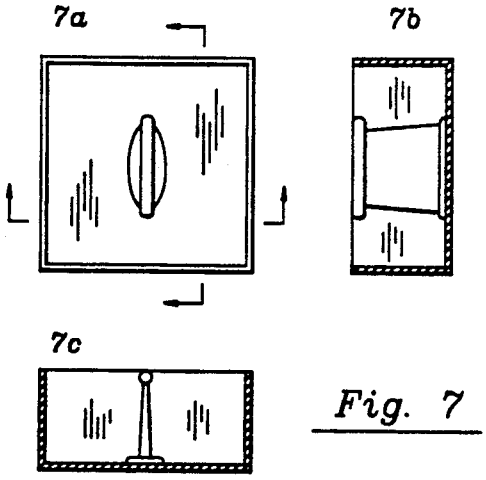
FIGS. 7 through 11 show a plan view (designated "a") and two sectional side views (designated "b" and "c", respectively) of various cavity configurations and antenna element placements.

While the first and second embodiments shown in FIGS. 2 and 3 utilize a rectangular conductive cavity defined by the walls 15 and the bottom 17, other cavity shapes can be used for the present invention without departing from the intent and scope thereof. FIGS. 7 through 11 show a plan view and two sectional side views of various cavity wall configurations and antenna element placements. Of these, FIG. 7 is the rectangular cavity wall embodiment described above in connection with FIG. 2 and shown here for reference to the other cavity configurations.

Figure 8:
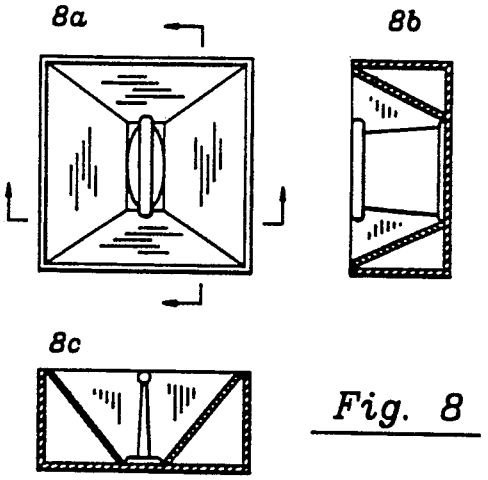

A horn shaped cavity is shown in FIG. 8. Here each of the side walls 15 slant inwardly toward a very small bottom wall which is large enough to support the blade antenna element 19. In this embodiment, FIG. 8, the side walls slant outwardly and continue to the edge of the cavity.

Figure 9:
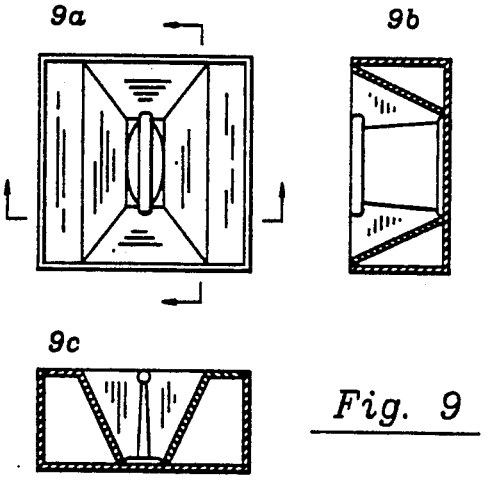
Figure 10:
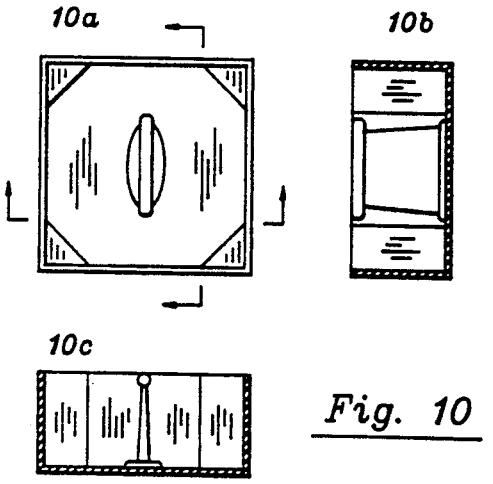
Figure 11:
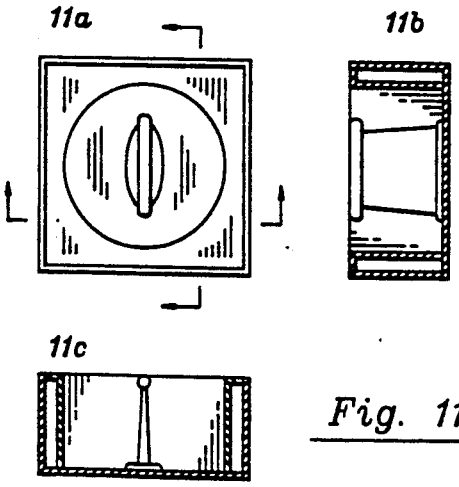

FIG. 9 shows a narrowed shaped horn cavity wall structure where the horn created by the cavity walls is more elongate. FIG. 10 shows a rectangular cavity, similar to the cavity of FIG. 7, but with the corners of the cavity blocked off to form octagon shaped side walls. Lastly, FIG. 11 shows a cylindrically shaped cavity.

Each of the cavity configurations shown in FIGS. 7 through 11 were evaluated according to the above described test procedure for performance over the frequency band range of 30–400 MHz. For this test evaluation, the cavity size varied although the outside dimensions of the cavity support structure were held constant.

Of the various configurations evaluated the design shown in FIG. 7 (the reference configuration) offered the best performance. This was due mainly to the larger volume of cavity area around the blade antenna therefore allowing it to radiate from a larger aperture. The configuration of FIG. 8 offered somewhat comparable performance in the 30–400 MHz frequency band, where performance is measured as frequency response, however, it never achieved full efficiency, measured as power output, as the reference configuration of FIG. 7.

The configuration of FIG. 9 offered comparable gain in the 30–60 MHz frequency region but fell off as much as 5 db in the frequency band of 150–400 MHz from the configuration of 7. The configuration of FIG. 10 performed closely to that of FIG. 9, while the performance of the configuration of 11 was considerably worse than all of the other configurations. In frequency band by approximately 5 db for this configuration with respect to the reference configuration of FIG. 7.

Changes can be made in the above-described invention without departing from the intent and scope thereof. It is therefore intended that the above-description be read as illustrative of the invention and not be interpreted in the limiting sense.

What is claimed is:

1. An electrically small cavity, broad bandwidth communications antenna for aircraft, comprising:

an electrically small conductive cavity mounted within a structural member of said aircraft, said cavity including a conductive enclosure which opens outwardly and which terminates at the surface of same aircraft structural member;

a dielectric material covering said open face of said cavity and providing an aerodynamically flush mount for said antenna;

a broad bandwidth antenna element positioned within said conductive enclosure and operating to excite same; and a tuning circuit connected to said antenna element which tunes said antenna for optimum radiation efficiency so as to continuously operate over the full bandwidth of 30 to 400 MHz.

2. The cavity antenna of claim 1 wherein said antenna element is connected to a communications transceiver and wherein said tuning circuit includes a logic converter connected to said communications transceiver and said antenna element.

3. The cavity antenna of claim 2 wherein said antenna element is a blade type antenna element.

4. The cavity antenna of claim 3 wherein said blade type antenna element is a tunable, hi-gain, broadband blade antenna element.

5. The cavity antenna of claim 4 wherein said conductive enclosure is electrically excitable by said blade antenna element to operate as a radiating element.

6. The cavity antenna of claim 5 wherein said conductive enclosure includes conductive side walls and a conductive bottom wall connected thereto.

7. The cavity antenna of claim 6 wherein said conductive side and bottom walls form a rectangular box structure.

8. The cavity antenna of claim 7 wherein said blade antenna element is positioned in the center of said bottom wall and extending perpendicularly therefrom parallel to said side walls.

9. The cavity antenna of claim 8 wherein said blade antenna element is positioned on a side wall and extending parallel to said bottom wall.

10. The cavity antenna of claim 6 wherein said logic converter includes:

a connection to said transceiver for sensing the frequency of transmission;

a programmable-read-only-memory (PROM) circuit for providing an instruction word as a function of a frequency sensed from said connection;

a control circuit connected to operate from an instruction word from said PROM circuit and provide an output; and a line driver tuning circuit connected to said control circuit output to tune said blade antenna element as a function of the control signals from said control circuit.

11. The cavity antenna of claim 10 wherein said conductive side and bottom walls form a rectangular box structure.

12. The cavity antenna of claim 11 wherein said blade antenna element is positioned in the center of said bottom wall and extending perpendicularly therefrom parallel to said side walls.

13. The cavity antenna of claim 12 wherein said blade antenna element is positioned on a side wall and extending parallel to said bottom wall.

14. The cavity antenna of claim 10 wherein said conductive side walls are curved and said conductive bottom wall is flat and circular, and wherein said blade antenna element is positioned in the center of said bottom wall and extends outwardly.

15. The cavity antenna of claim 10 wherein said conductive side walls are slanted inwardly and wherein said conductive bottom wall extends parallel to said open face and intersects said slanted sidewalls, said blade antenna element being mounted on said bottom wall and extends outwardly therefrom.

16. The cavity antenna of claim 6 wherein said conductive side walls are curved and said conductive bottom wall is flat and circular, and wherein said blade antenna element is positioned in the center of said bottom wall and extends outwardly.

17. The cavity antenna of claim 6 wherein said conductive side walls are slanted inwardly and wherein said conductive bottom wall extends parallel to said open face and intersects said slanted side walls, said blade antenna element being mounted on said bottom wall and extends outwardly therefrom.

* * * * *